United States Patent
Koizumi et al.

(10) Patent No.: US 8,571,303 B2
(45) Date of Patent: Oct. 29, 2013

(54) STEREO MATCHING PROCESSING SYSTEM, STEREO MATCHING PROCESSING METHOD AND RECORDING MEDIUM

(75) Inventors: Hirokazu Koizumi, Osaka (JP); Toshiyuki Kamiya, Osaka (JP); Hiroyuki Yagyuu, Osaka (JP)

(73) Assignee: NEC System Technologies, Ltd., Osaka-Shi, Osaka (JP)

( * ) Notice: Subject to any disclaimer, the term of this patent is extended or adjusted under 35 U.S.C. 154(b) by 753 days.

(21) Appl. No.: 12/292,764

(22) Filed: Nov. 25, 2008

(65) Prior Publication Data

US 2010/0128972 A1    May 27, 2010

(51) Int. Cl.
  *G06T 15/00* (2011.01)
  *G06K 9/00* (2006.01)
  *G01C 3/14* (2006.01)

(52) U.S. Cl.
  USPC .............................. 382/154; 345/419; 356/12

(58) Field of Classification Search
  USPC .................................................. 382/106, 154
  See application file for complete search history.

(56) References Cited

U.S. PATENT DOCUMENTS

| | | | | |
|---|---|---|---|---|
| 5,383,013 A | * | 1/1995 | Cox | 356/2 |
| 5,852,672 A | * | 12/1998 | Lu | 382/154 |
| 6,023,276 A | * | 2/2000 | Kawai et al. | 345/419 |
| 6,718,062 B1 | * | 4/2004 | Zhang et al. | 382/218 |
| 2008/0205748 A1 | * | 8/2008 | Lee et al. | 382/154 |
| 2008/0310681 A1 | * | 12/2008 | Payton | 382/106 |

FOREIGN PATENT DOCUMENTS

| | | |
|---|---|---|
| JP | 8-16930 | 2/1996 |
| JP | 2002-099902 A | 4/2002 |
| JP | 2002-230527 | 8/2002 |

OTHER PUBLICATIONS

Mikio Takagi et al., "Handbook of Image Analysis," University of Tokyo Press pp. 597-599, 1991.
Notification of Reasons for Rejection, dated Oct. 2, 2012, with English translation.
Notification of Reasons for Rejection, dated Feb. 19, 2003 with partial English translation.

* cited by examiner

*Primary Examiner* — Amir Alavi
*Assistant Examiner* — Kenny Cese
(74) *Attorney, Agent, or Firm* — McGinn IP Law Group, PLLC

(57) ABSTRACT

A stereo matching processing system includes an associating unit that associates with each other such regions, in a plurality of images obtained by shooting a same object from different directions, that are on a same scanning line and have a largest correlation coefficient between them, as items that represent a same position, and a line segment determining unit that determines whether or not line segments that are associated with each other as items that teach a same position are drawn in the plurality of images respectively. When said line segment determining unit determines that the line segments are drawn, said associating unit associates with each other, not such regions that are on the same scanning line and have a largest correlation coefficient between them, but intersections at which the scanning line and the line segments each cross, as items that represent a same position.

9 Claims, 13 Drawing Sheets

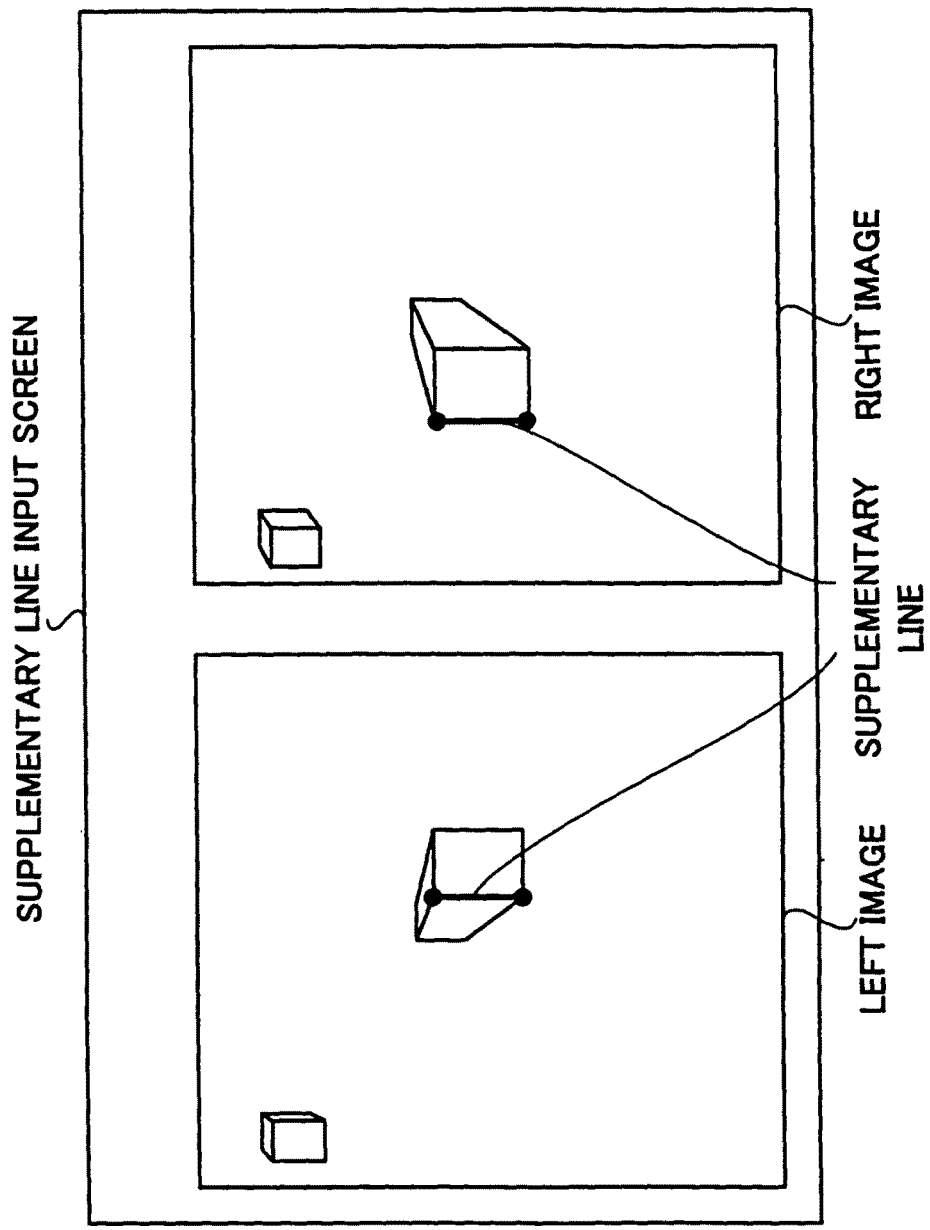

STEREO MATCHING RESULT (=DISPARITY DATA)
WITH NO SUPPLEMENTATION BY SUPPLEMENTARY LINES

STEREO MATCHING RESULT (=DISPARITY DATA)
WITH SUPPLEMENTATION BY SUPPLEMENTARY LINES

WRONG ASSOCIATION

REDRESSED ASSOCIATION

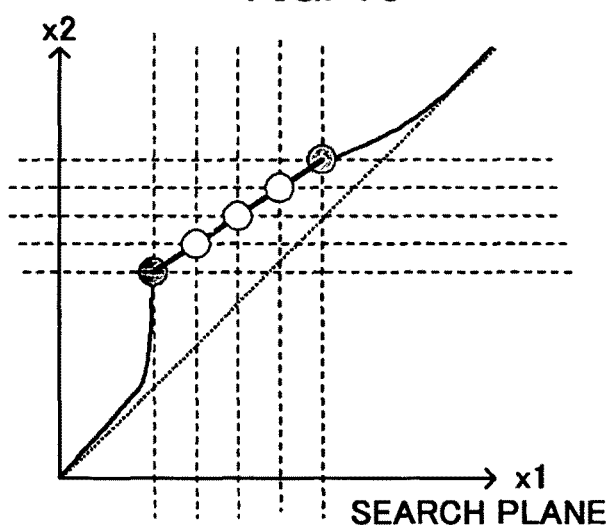

STEREO MATCHING PROCESSING SYSTEM, STEREO MATCHING PROCESSING METHOD AND RECORDING MEDIUM

BACKGROUND OF THE INVENTION

1. Field of the Invention

The present invention relates to a stereo matching processing system, a stereo matching processing method, and a recording medium, and particularly to a stereo matching processing system, a stereo matching processing method, and a recording medium that can correctly match coinciding positions between a plurality of images.

2. Description of the Related Art

Conventionally, three-dimensional data automatic generation methods of this kind have commonly employed stereo matching of images acquired from artificial satellites, aircraft, etc. and to generate three-dimensional landform data [Digital Surface Model (DSM) data]. A method that uses an operator's presence to let him/her correct any position, for which matching is unsuccessful, has also been proposed.

Here, a stereo matching process is for finding matching points, which shows the same position in the real scene, from two images or so-called stereo images that are captured from different viewpoints, and calculating the depth to an object of interest or its shape according to the principle of triangulation by using the disparity between the matching points.

Various stereo matching processing techniques have already been proposed. For example, as image correlation technique that is widely used, Examined Japanese Patent Application KOKOKU Publication No. H8-16930 discloses a method of finding matching points by setting a correlation window as a template in a left image, calculating a coefficient of cross-correlation between the template and a search window in a right image as their matching degree while moving the search window in the right image, and searching out a position at which the matching degree is high. The content of Examined Japanese Patent Application KOKOKU Publication No. H8-16930 is incorporated herein.

This method reduces the amount of processing by restricting the search window to move only in the direction of an epipolar line, and thus can obtain, for each point in the left image, an amount of x-direction displacement, i.e., disparity, of a point in the right image that matches that point in the left image. An epipolar line is a line that, for a given point in one of stereo images, can be drawn in the other of the stereo images as a range in which a point that matches that given point can exist (for example, see "Handbook of Image Analysis" (edited by Mikio Takagi and Haruhisa Shimoda, published by University of Tokyo Press, January 1991, pp. 597-599).

Normally, the direction of an epipolar line is different from the direction of an image scanning line. However, coordinate transformation can reorient the direction of the epipolar line to be brought in line with the direction of the image scanning line. This coordinate transformation technique is described in "Handbook of Image Analysis" identified above. The content of "Handbook of Image Analysis" is also incorporated herein.

In a stereo image that is reoriented in the way described above, the matching point search window can be restricted to move only on the scanning line. Therefore, a disparity can be obtained as a difference between the x-coordinate values of the matching points in the left and right images.

SUMMARY OF THE INVENTION

However, conventional three-dimensional data generation techniques that employ stereo matching cannot exclude a region with no texture or a region for which a matching region cannot be found by means of a coefficient of correlation. Therefore, images of the three-dimensional data include many points that are at a wrong height greatly different from the surroundings. Particularly, buildings or the like get surrounding things concealed and images might therefore include many points that cannot find a matching point, or include points that are at a significantly prominent height, or the buildings in the image might have lost a significant part of the body.

Therefore, conventional three-dimensional data generation by stereo matching might produce errors due to mismatching of points and cannot generate highly accurate three-dimensional information, and suffers a problem that it cannot be used for complicated images representing urban areas, etc. that include many buildings.

The present invention was made for solving the above problem, and an object of the present invention is to provide a stereo matching processing system, a stereo matching processing method, and a recording medium that can correctly match regions in a plurality of images that show the same position.

To achieve the above object, a stereo matching processing system according to a first aspect of the present invention includes: an associating unit that associates with each other such regions, in a plurality of images obtained by shooting a same object from different directions, that are on a same scanning line and have a largest correlation coefficient between them, as items that represent a same position; and a line segment determining unit that determines whether or not line segments that are associated with each other as items that teach a same position are drawn in the plurality of images respectively, and in a case where the line segment determining unit determines that the line segments are drawn, the associating unit associates with each other, not such regions that are on the same scanning line and have a largest correlation coefficient between them, but intersections at which the scanning line and the line segments each cross, as items that represent a same position.

A stereo matching processing method according to a second aspect of the present invention includes: an associating step of associating with each other such regions, in a plurality of images obtained by shooting a same object from different directions, that are on a same scanning line and have a largest correlation coefficient between them, as items that represent a same position; and a line segment determining step of determining whether or not line segments that are associated with each other as items that teach a same position are drawn in the plurality of images respectively, and in a case where it is determined at the line segment determining step that the line segments are drawn, not such regions that are on the same scanning line and have a largest correlation coefficient between them but intersections at which the scanning line and the line segments each cross are associated with each other at the associating step as items that represent a same position.

A recording medium according to a third aspect of the present invention is a computer-readable recording medium that stores a program for controlling a computer to perform: an associating procedure of associating with each other such regions, in a plurality of images obtained by shooting a same object from different directions, that are on a same scanning line and have a largest correlation coefficient between them, as items that represent a same position; and a line segment determining procedure of determining whether or not line segments that are associated with each other as items that teach a same position are drawn in the plurality of images respectively, and in a case where it is determined by the line segment determining procedure that the line segments are drawn, not such regions that are on the same scanning line and have a largest correlation coefficient between them but intersections at which the scanning line and the line segments each cross are associated with each other by the associating procedure as items that represent a same position.

According to the present invention, it is possible to provide a stereo matching processing system, a stereo matching processing method, and a recording medium that can correctly match coinciding positions between a plurality of images.

BRIEF DESCRIPTION OF THE DRAWINGS

These objects and other objects and advantages of the present invention will become more apparent upon reading of the following detailed description and the accompanying drawings in which:

FIG. 2 is a diagram showing an example of how a supplementary line input screen is displayed;

FIG. 13 is a diagram showing a search plane in a modified example.

DETAILED DESCRIPTION OF THE PREFERRED EMBODIMENT

Figure 1:
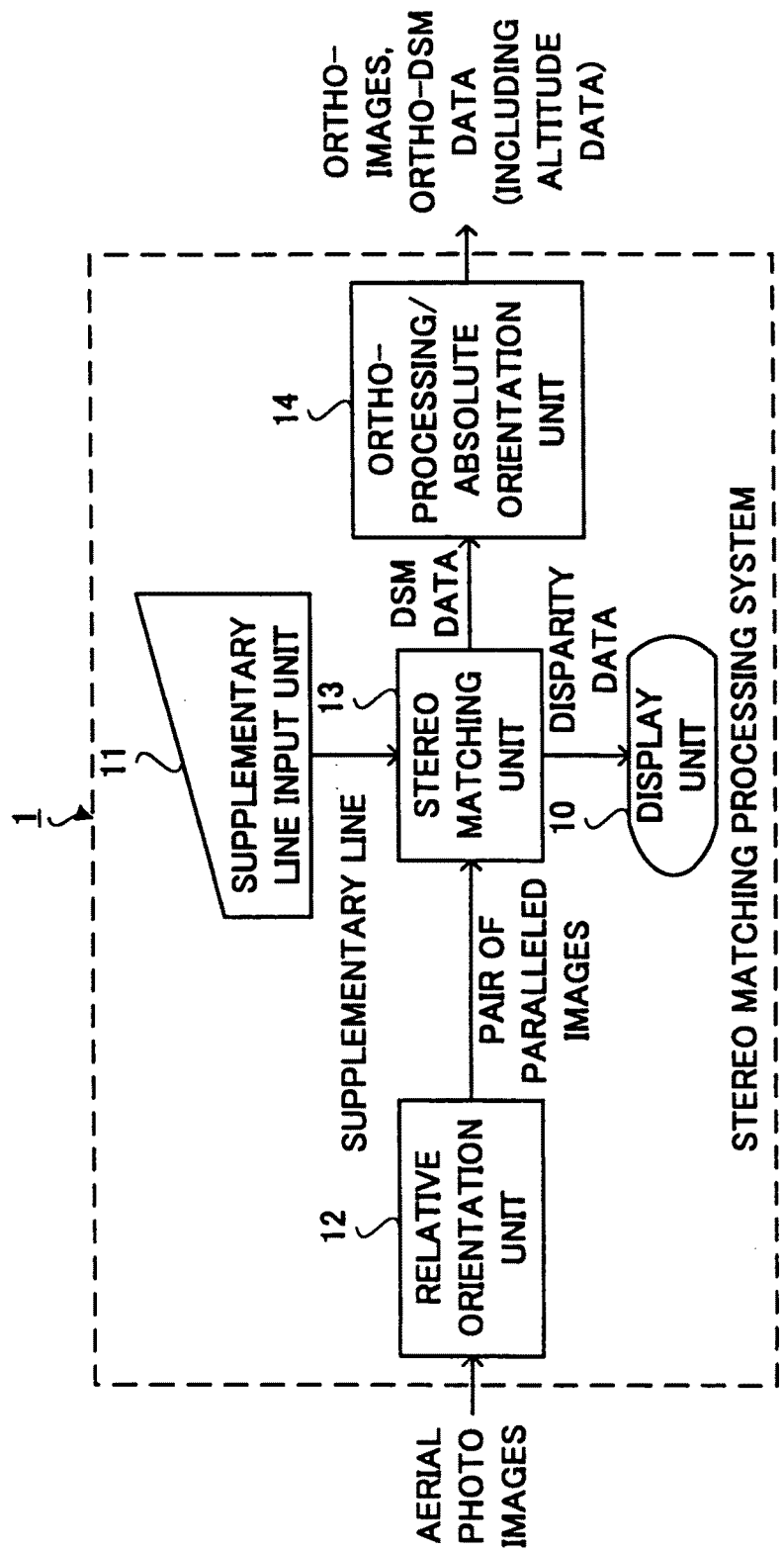
FIG. 1 is a block diagram showing an example configuration of a stereo matching processing system.

Next, the best mode for carrying out the present invention will be explained with reference to the drawings. FIG. 1 is a block diagram showing an example configuration of a stereo processing system according to an embodiment of the present invention. The stereo processing system 1 is constituted by, for example, a general-purpose computer or the like, and includes a display unit 10, a supplementary line input unit 11, a relative orientation unit 12, a stereo matching unit 13, and an ortho-processing/absolute orientation unit 14 as shown in FIG. 1.

The display unit 10 is constituted by, for example, a Liquid Crystal Display (LCD) or the like, and displays a supplementary line input screen shown in FIG. 2 that includes two aerial photo images (hereinafter referred to as left image and right image) that are obtained by shooting the same object from different directions, or a result of stereo matching of the left image and the right image shown in FIG. 3.

The supplementary line input unit 11 is constituted by, for example, a keyboard, a mouse, etc., and used when, for example, an operator draws supplementary lines in the left image and the right image on the supplementary line input screen displayed on the display unit 10. A supplementary line is a line segment by which the operator associates coinciding positions in the left image and the right image.

The relative orientation unit 12 is embodied by, for example, a Central Processing Unit (CPU), a Read Only Memory (ROM), a Random Access Memory (RAM), a hard disk drive, etc., and performs an orientation process of evaluating camera parameters that have been used for shooting, and if necessary, a paralleling process of re-projecting the left image and the right image onto parallel planes perpendicular to a common normal, etc. Here, orientation is to determine a value of a predetermined characteristic of the orientation object.

Specifically, in the orientation process, the relative orientation unit 12 reads the coordinate values of an object that is commonly shot into the left image and the right image, and by using the read two coordinate values, evaluates the camera parameters used for shooting, such as the rotational angle of the camera between the left image and the right image. In this way, the relative orientation unit 12 can evaluate camera parameters used for shooting, which are normally difficult to discriminate, even when aerial photos were taken from directions close to the vertical direction, because of influences of the aircraft's posture changes, etc.

After this, the relative orientation unit 12 performs a paralleling process to re-project the left image and the right image onto parallel planes perpendicular to a common normal such that epipolar lines in the left image and the right image that join epipoles in the respective images coincide with one of a plurality of scanning lines.

The stereo matching unit 13 is embodied by, for example, a CPU, a ROM, a RAM, a hard disk drive, etc., and has in the RAM a supplementary line input flag for showing that supplementary lines have been input to the left image and the right image respectively, and an intersection coordinates buffer for storing the coordinates of an intersection at which a supplementary line and a scanning line cross.

The stereo matching unit 13 applies a stereo matching process, specifically, a Dynamic Programming (DP) matching process to the left image and the right image (a pair of paralleled images) to which the relative orientation unit 12 has applied a paralleling process, and thereby measures a displacement (disparity) between the left image and the right image and generates disparity data.

Figure 4:
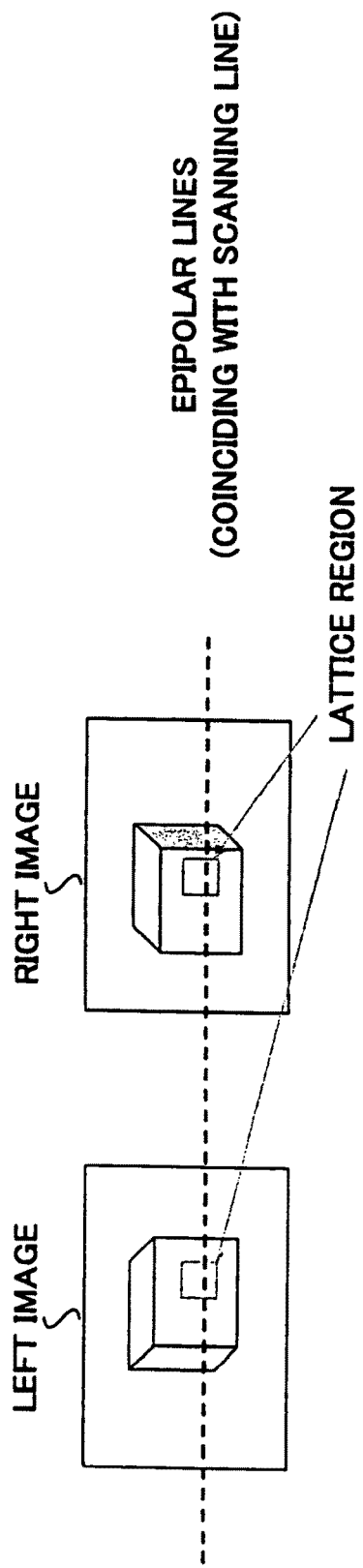
FIG. 4 is a diagram for explaining a DP matching process.

Specifically, in a DP matching process, in a case where no supplementary lines are input by the operator into the left image and the right image by operating the supplementary line input unit 11, the stereo matching unit 13 checks correlation between the left image and the right image along the same scanning line, and searches out lattice regions that have the largest correlation coefficient between them, as shown in FIG. 4.

Figure 5:
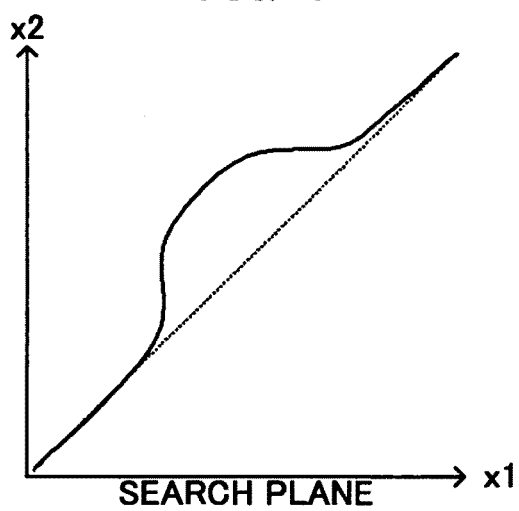
FIG. 5 is a diagram exemplifying a search plane.

Then, the stereo matching unit 13 associates the central coordinates of the lattice regions that have the largest correlation coefficient on a search plane shown in FIG. 5. In this search plane, the horizontal axis x1 represents x-coordinates of the right image, and the vertical axis x2 represents x-coordinates of the left image.

Figure 3A:
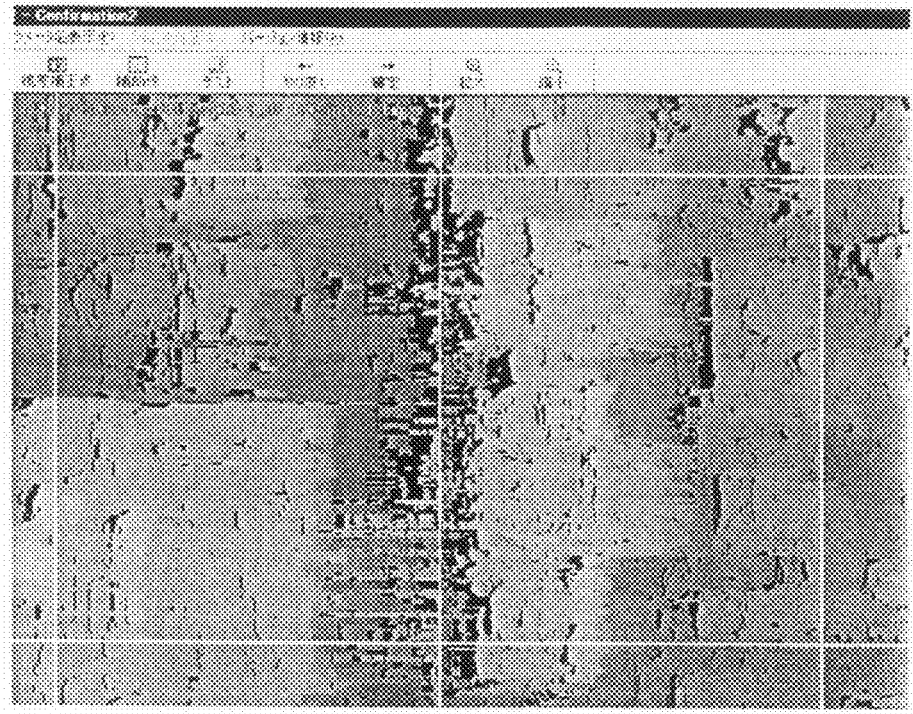
FIG. 3A is a diagram showing an example of how a stereo matching result with no supplementation by supplementary lines is displayed.

The stereo matching unit 13 generates disparity data by performing such association for each scanning line, and displays such an image as shown in FIG. 3A on the display unit 10 as the stereo matching result.

As compared to this case, in a case where supplementary lines are input by the operator into the left image and the right image respectively by operating the supplementary line input unit 11, the stereo matching unit 13 associates, for the portion into which the supplementary line is input, the coordinate of an intersection at which a scanning line and the supplementary line cross with the coordinate of such an intersection in the other image on the search plane. Meanwhile, for a portion into which no supplementary line is input, the stereo matching unit 13 associates the coordinates of the center positions of lattice regions that have the largest correlation coefficient on the search plane.

Figure 3B:
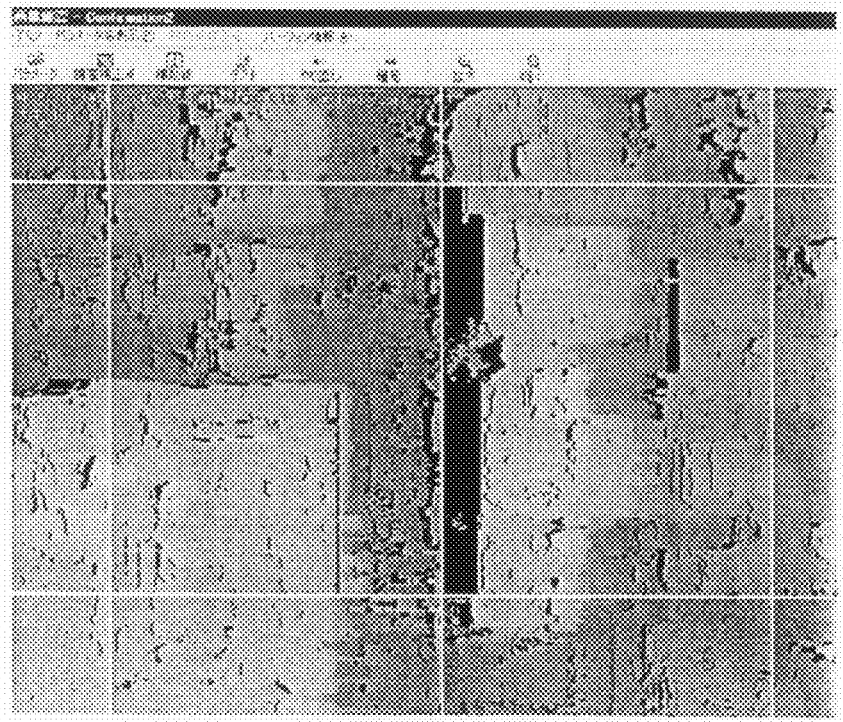
FIG. 3B is a diagram showing an example of how a stereo matching result with supplementation by supplementary lines is displayed.
Figure 6:
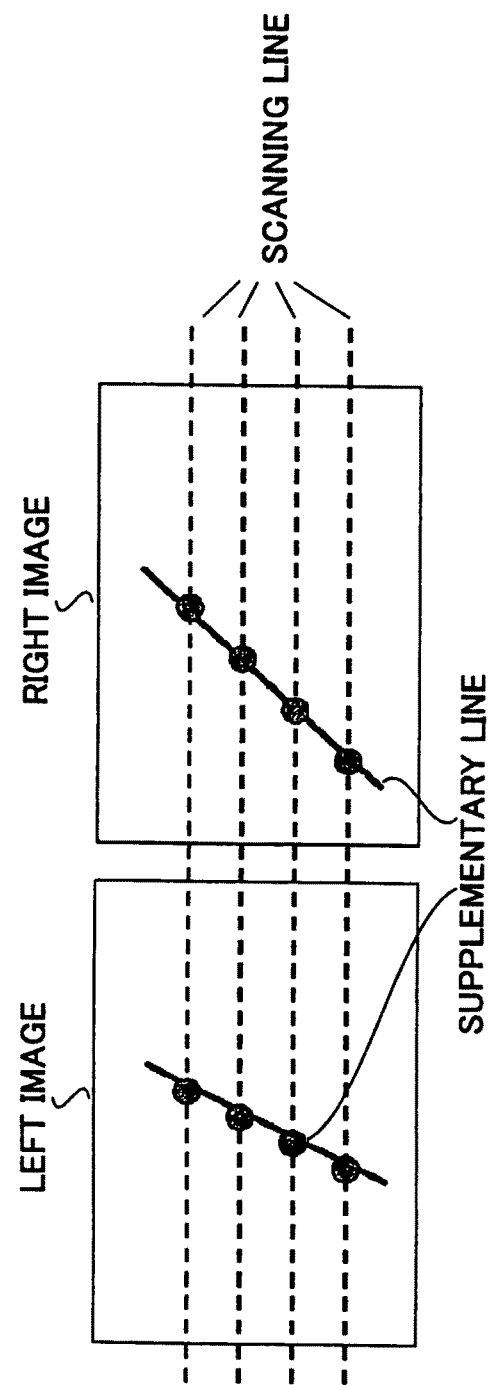
FIG. 6 is a diagram for explaining a stereo matching process.

Then, the stereo matching unit 13 generates disparity data supplemented by the supplementary lines by performing such association for each scanning line as shown in FIG. 6, and displays such an image as shown in FIG. 3B on the display unit 10 as the stereo matching result.

After this, by using the generated disparity data and the camera parameters evaluated by the relative orientation unit 11 in combination, the stereo matching unit 13 calculates a position in a three-dimensional coordinate system that corresponds to each pixel according to the principle of triangulation and extracts Digital Surface Model (DSM) data that includes altitude data indicating the height of a surface layer of an object, thereby to calculate the depth to the object and the shape of the object.

The ortho-processing/absolute orientation unit 14 is embodied by, for example, a CPU, a ROM, a RAM, a hard disk drive, etc., and generates ortho-images and ortho-DSM data by performing an ortho-process of transforming the aerial photo images and DSM data into ortho-images and ortho-DSM by using the DSM data, and an absolute orientation process of calculating accurate coordinates of the object on the earth's surface, specifically, the longitude and latitude of the object, by using the aerial photo images and DSM data to which the ortho-process has been applied.

The ortho-images include color data, and latitude data and longitude data that indicate the latitude and longitude that have been calculated by the absolute orientation. The ortho-DSM data includes altitude data that indicates the height of the surface layer of an object and latitude data and longitude data. By calculating latitude data and longitude data, it is possible to associate with each other, the positions of the same object in the images of the aerial photos that were captured at different timings.

Next, processes performed by the stereo matching processing system having the above configuration will be explained with reference to the drawings.

The stereo matching processing system regularly performs a supplementary line input process and a stereo matching process.

Figure 7:
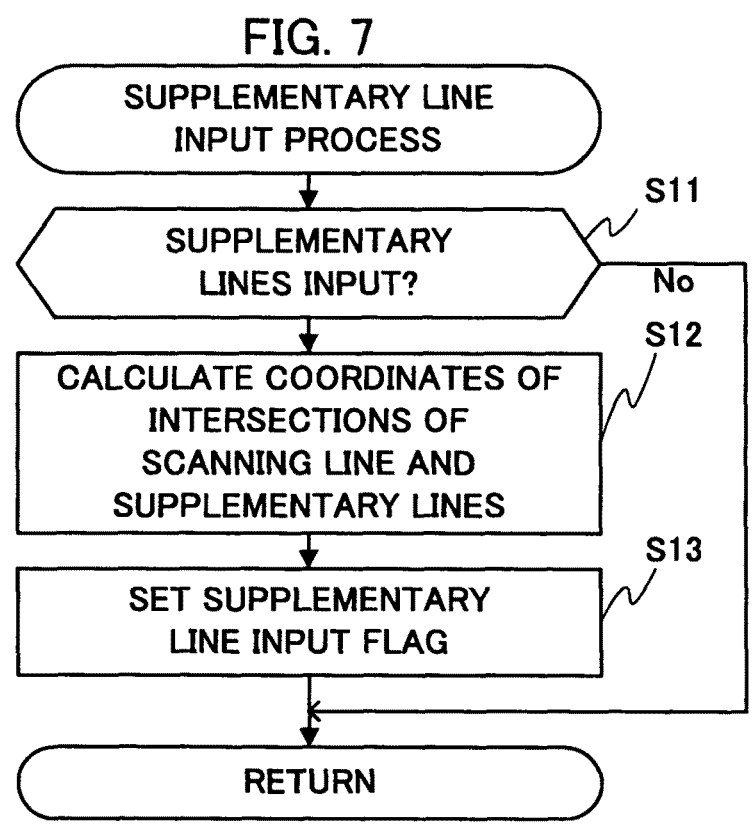
FIG. 7 is a flowchart showing an example of a supplementary line input process.

FIG. 7 is a flowchart showing the supplementary line input process in detail. In the supplementary line input process, the stereo matching unit 13 determines whether or not a supplementary line has been input by the operator by operating the supplementary line input unit 11 into each of the left image and the right image on the supplementary line input screen displayed on the display unit 10 (step S11). In a case where no supplementary line has been input (step S11; No), the stereo matching unit 13 terminates the supplementary line input process.

On the contrary, in a case where it is determined in the process of step S11 that a supplementary line has been input (step S11; Yes), the stereo matching unit 13 calculates the coordinates of the intersection at which a scanning line and the supplementary line cross for each of the left image and the right image, and stores the coordinates in the intersection coordinates buffer secured in the RAM (step S12).

Then, the stereo matching unit 13 sets the supplementary line input flag secured in the RAM to ON state (step S13), and terminates the supplementary line input process.

Figure 8:
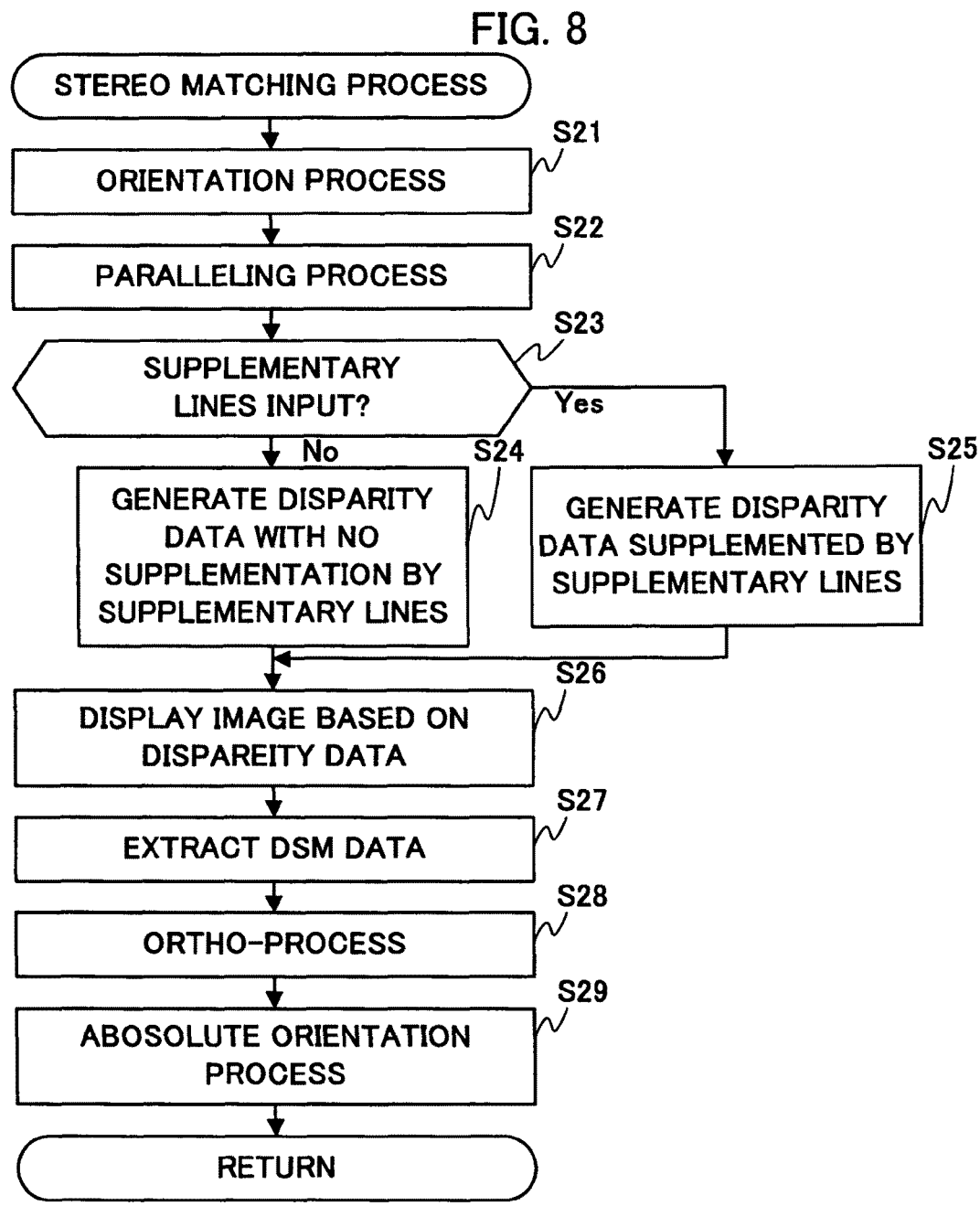
FIG. 8 is a flowchart showing an example of a stereo matching process.

FIG. 8 is a flowchart showing the stereo matching process in detail. In the stereo matching process, the relative orientation unit 12 performs an orientation process to evaluate camera parameters used for shooting (step S21), and performs a paralleling process to re-project the left image and the right image onto parallel planes perpendicular to a common normal such that epipolar lines coincide with one of a plurality of scanning lines (step S22).

Next, the stereo matching unit 13 checks whether or not the supplementary line input flag secured in the RAM is set ON to determine whether or not a supplementary line has been input into each of the left image and the right image (step S23).

In a case where it is determined in the process of step S23 that no supplementary line has been input (step S23; No), the stereo matching unit 13 generates disparity data that is not supplemented by supplementary lines (step S24).

In the process of step S24, the stereo matching unit 13 checks correlation between the left image and the right image along the same scanning line to search out every pair of lattice regions that have the largest correlation coefficient between them. Then, the stereo matching unit 13 associates the central coordinates of the lattice regions that have the largest correlation coefficient on a search plane. The stereo matching unit 13 performs such association for each scanning line and generates disparity data that is not supplemented by supplementary lines.

On the contrary, in a case where it is determined in the process of step S23 that a supplementary line has been input (step S23; Yes), the stereo matching unit 13 generates disparity data that is supplemented by supplementary lines (step S25).

In the process of step S25, the stereo matching unit 13 associates, for the portion into which the supplementary line has been input, the coordinates, stored in the intersection coordinates buffer secured in the RAM, of the intersection at which a scanning line and the supplementary line cross with such coordinates in the other image on the search plane, and for a portion into which no supplementary line has been input, the coordinates of the center positions of lattice regions that have the largest correlation coefficient on the search plane. The stereo matching unit 13 performs such association for each scanning line and generates disparity data that is supplemented by supplementary lines.

Then, the stereo matching unit 13 displays an image that is based on the disparity data generated in the process of step S24 or S25 on the display unit 10 as a stereo matching result (step S26), and extracts DSM data that includes altitude data indicating the superficial height of the object by using the disparity data and the camera parameters evaluated in the process of step S21 (step S27).

Then, the ortho-processing/absolute orientation unit 14 performs an ortho-process by using the DSM data extracted in the process of step S27, thereby transforming the aerial photo images and the DSM data into ortho-images and ortho-DSM (step S28).

Then, the ortho-processing/absolute orientation unit 14 performs an absolute orientation process by using the DSM data to which the ortho-process has been applied at step S28, thereby generating ortho-images and ortho-DSM data that includes altitude data indicating the superficial height of the object (step S29).

Subsequently, the operation of the stereo matching processing system when performing the above-described processes will be explained in a specific example.

In a case where no supplementary line has been input, in which case it is determined in the process of step S23 shown in FIG. 8 that the supplementary line input flag is set OFF, the central coordinates of every pair of lattice regions that have the largest correlation coefficient between them are associated with each other on the search plane in the process of step S24.

Figure 9A:
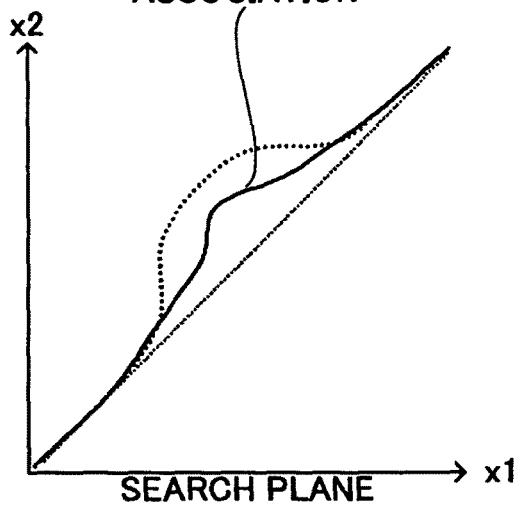
FIG. 9A is a diagram exemplifying a search plane before correction by supplementary lines.
Figure 10:
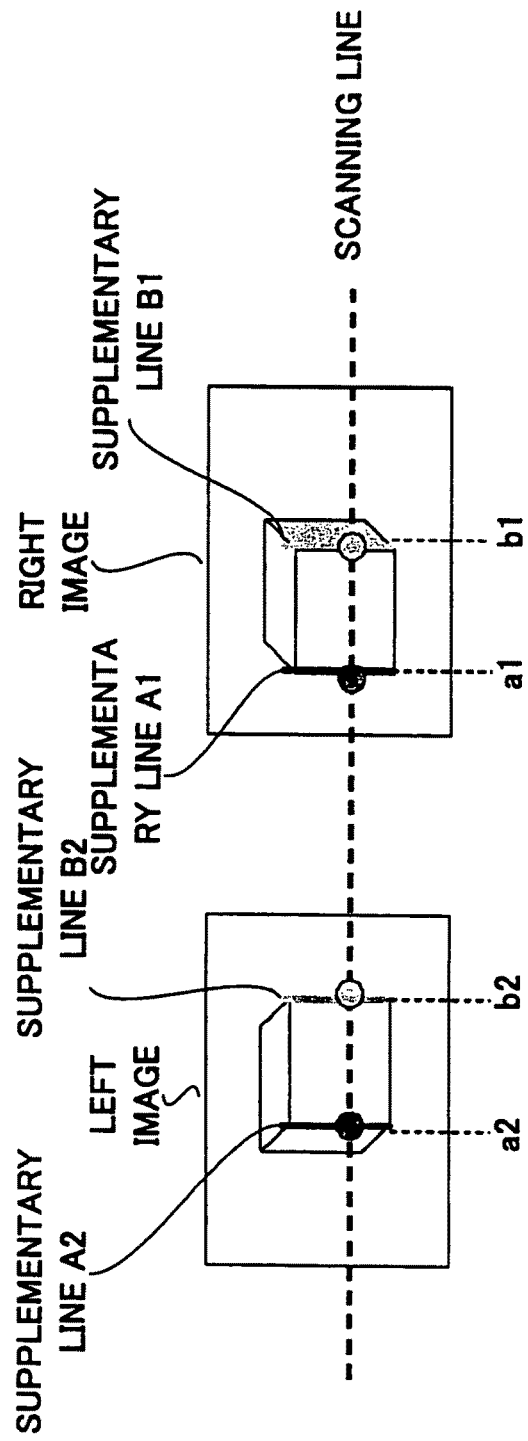
FIG. 10 is a diagram for explaining redress of association with the use of supplementary lines.

In a case where a wrong association is made on the search plane as shown in FIG. 9A in the process of step S24, the operator operates the supplementary line input unit 11 to input a supplementary line A2 on the left image and a supplementary line A1 on the right image in association, as shown in FIG. 10 and a supplementary line B2 on the left image and a supplementary line B1 on the right image in association.

After this, x-coordinates a1, a2, b1, and b2 of the intersections at which a scanning line and the supplementary lines A1, A2, B1, and B2 cross each other are obtained respectively in the process of step S12 shown in FIG. 7, and the supplementary line input flag is set ON in the process of step S13.

Figure 9B:
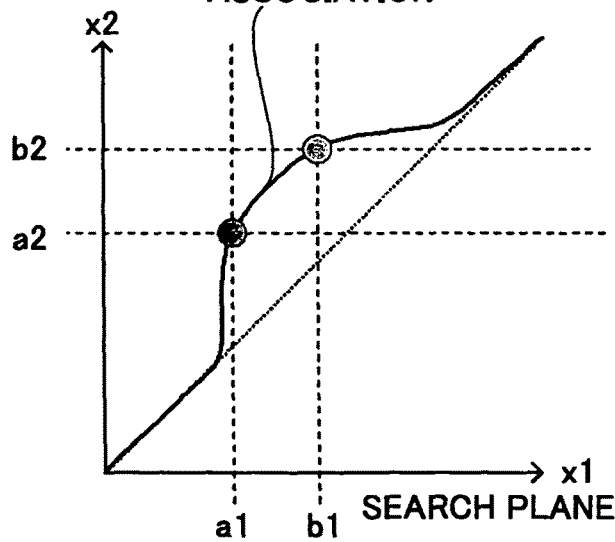
FIG. 9B is a diagram exemplifying a search plane after correction by supplementary lines.

This time, it will be determined in the process of step S23 shown in FIG. 8 that the supplementary line input flag is set ON. Therefore, in the process of step S25, as shown in FIG. 9B, the coordinate a2 of the intersection at which the scanning line and the supplementary line A2 cross in the left image is associated on the search plane with the coordinate a1 of the intersection at which the scanning line and the supplementary line A1 cross in the right image, and the coordinate b2 of the intersection at which the scanning line and the supplementary line B2 cross in the left image is associated on the search plane with the coordinate b1 of the intersection at which the scanning line and the supplementary line B1 cross in the right image, respectively.

As a result, the stereo matching processing system 1 can redress the wrong association on the search plane and correctly associate the coinciding positions of the left image and the right image.

As explained above, the stereo matching processing system 1 according to the present embodiment can redress the wrong association on the search plane by applying correction by the supplementary lines, and can therefore correct the disparity data presented as a stereo matching result. Then, the stereo matching processing system 1 can obtain altitude data that accurately indicates the superficial height of the object, by extracting DSM data using the corrected disparity data.

The present invention is not limited to the above embodiment, but can be variously modified or developed. A modified example of the above embodiment that can be applied to the present invention will now be explained below.

Figure 11:
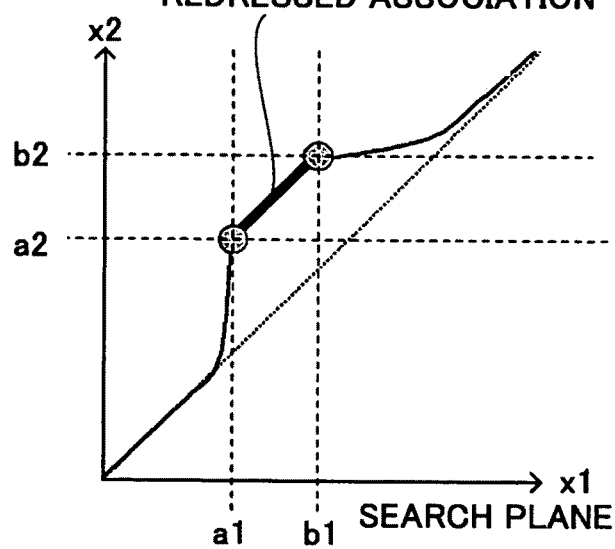
FIG. 11 is a diagram showing a search plane in a modified example.

The above embodiment has explained that in the process of step S25 shown in FIG. 8, the coordinate a2 of the intersection at which the scanning line and the supplementary line A2 cross in the left image is associated on the search plane with the coordinate a1 of the intersection at which the scanning line and the supplementary line A1 cross in the right image, and the coordinate b2 of the intersection at which the scanning line and the supplementary line B2 cross in the left image is associated on the search plane with the coordinate b1 of the intersection at which the scanning line and the supplementary line B1 cross in the right image, and in between them, the central coordinates of lattice regions that have the largest correlation coefficient are associated with each other on the search plane. However, the present invention is not limited to this, but all the points that exist on the line segment that join the coordinates (a1, a2) and the coordinates (b2, b2) on the search plane may be associated as shown in FIG. 11.

Whether or not to input supplementary lines (compulsory supplementary lines) for making such association may be decided by the operator by operating the supplementary line input unit 11.

Figure 12:
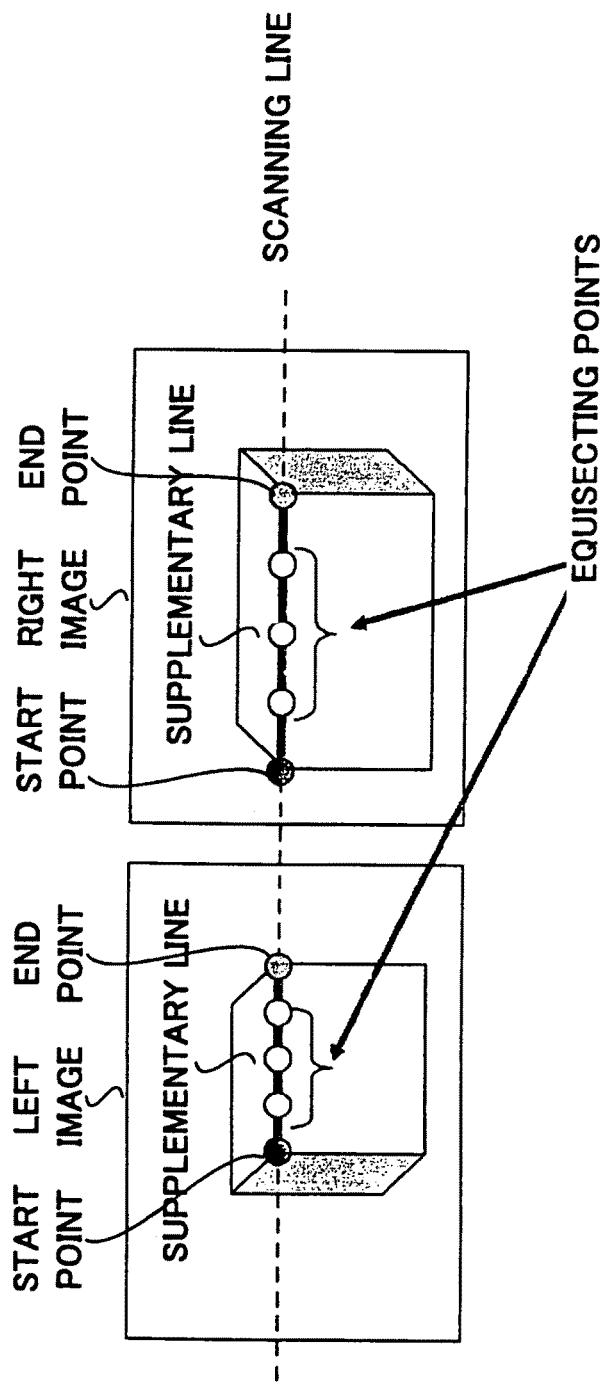
FIG. 12 is a diagram for explaining redress of association with the use of supplementary lines in a modified example.

The above embodiment has explained an example in which a supplementary line is drawn perpendicularly to a scanning line, but the present invention is not limited to this. A supplementary line may be drawn in parallel with a scanning line as shown in FIG. 12. In a case where a supplementary line is drawn in parallel with a scanning line, the points (equally-spaced points) that segment the supplementary line (line segment) in each of the left image and the right image into n (n being a natural number) number of equal parts may be associated on the examination plane in order from the start point of the line segment to the end point thereof as shown in FIG. 13.

The above embodiment has explained that in an orientation process, the relative orientation unit 11 reads the coordinate values of an object that is commonly shot into the left image and the right image, and evaluates the camera parameters used for shooting, such as the rotational angle of the camera between the left image and the right image, by using the read two coordinate values. However, the present invention is not limited to this, but the camera parameters used for shooting may be evaluated by an arbitrary method and may be evaluated with the use of values that are calculated by a figure drawing program, for example.

The above embodiment has explained that the ortho-processing/absolute orientation process 14 performs an absolute orientation of calculating the longitude and latitude of an object by using aerial photo images and DSM data to which an ortho-process has been applied. However, the present invention is not limited to this, but absolute orientation may be performed by an arbitrary method. For example, a conversion formula for obtaining surface coordinates (longitude, latitude, and altitude values) on the earth's surface may be derived from image coordinates (longitude, latitude, and altitude values) of a plurality of points on aerial photo images, from which image coordinates have been detected beforehand.

Aerotriangulation data that indicates longitude, latitude, and altitude measured by capturing aerial photos such that the photos include an anti-air indicator may be used. In this way, the surface coordinate values of an arbitrary coordinate point on an image can be obtained. An anti-air indicator is an indicator whose shape can be clearly recognized from an image of an aerial photo that is captured by a sensor of any type mounted on aircraft, and whose image coordinates can be measured. Hence, where an anti-air indicator is set, accurate three-dimensional coordinates are indicated.

The above embodiment has explained that an ortho-image includes color data and latitude data and longitude data, and ortho-DSM data includes altitude data, latitude data, and longitude data. However, the present invention is not limited to this. An ortho-image and ortho-DSM data may include, instead of latitude data and longitude data, coordinate value data that is represented in another coordinate system, and instead of altitude data, height data that indicates a relative height with respect to any other reference.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A stereo matching processing system, comprising:

an associating unit that associates with each other such regions, in a plurality of images obtained by shooting a same object from different directions, that are on a same scanning line and have a largest correlation coefficient between them, as items that represent a same position; and a line segment determining unit that determines whether or not line segments that are associated with each other as items that teach a same position are drawn in the plurality of images respectively, wherein when said line segment determining unit determines that the line segments are drawn, said associating unit associates with each other, not such regions that are on the same scanning line and have a largest correlation coefficient between them, but intersections at which the scanning line and the line segments each cross, as items that represent a same position, wherein said associating unit generates disparity data supplemented by the supplementary lines by performing an association for each scanning line and wherein the generated disparity data is used to calculate a position in a three-dimensional coordinate system that corresponds to a pixel according to triangulation and extracts Digital Surface Model (DSM) data that includes altitude data indicating a height of a surface layer of an object, thereby to calculate a depth to the object and a shape of the object.

2. The stereo matching processing system according to claim 1, wherein when a plurality of the line segments are drawn in each of the plurality of images, said associating unit associates with each other, a line segment that joins intersections at which the scanning line and the line segments each cross in one of the plurality of images and a line segment that joins intersections at which the scanning line and the line segments each cross in the other of the plurality of images, as items that represent a same position.

3. The stereo matching processing system according to claim 1, wherein when the line segments are drawn in parallel with the scanning line in the plurality of images respectively, said associating unit associates start points of the line segments with each other and end points of the line segments with each other as items that represent a same position.

4. The stereo matching processing system according to claim 3, wherein when the line segments are drawn in parallel with the scanning line in the plurality of images respectively, said associating unit associates with each other, each of equally-spaced points that segment the line segment in one of the plurality of images into a predetermined number of equal parts and each of equally-spaced points that segment the line segment in the other of the plurality of images into the predetermined number of equal parts in order from the start points, as items that represent a same position.

5. A stereo matching processing method, comprising:

associating with each other such regions, in a plurality of images obtained by shooting a same object from different directions, that are on a same scanning line and have a largest correlation coefficient between them, as items that represent a same position; and determining whether or not line segments that are associated with each other as items that teach a same position are drawn in the plurality of images respectively, wherein when it is determined at said determining that the line segments are drawn, not such regions that are on the same scanning line and have a largest correlation coefficient between them, but intersections at which the scanning line and the line segments each cross are associated with each other at said associating step as items that represent a same position, wherein said associating unit generates disparity data supplemented by the supplementary lines by performing an association for each scanning line and wherein the generated disparity data is used to calculate a position in a three-dimensional coordinate system that corresponds to a pixel according to triangulation and extracts Digital Surface Model (DSM) data that includes altitude data indicating a height of a surface layer of an object, thereby to calculate a depth to the object and a shape of the object.

6. A non-transitory computer-readable recording medium that stores a program for controlling a computer to perform:

an associating procedure of associating with each other such regions, in a plurality of images obtained by shooting a same object from different directions, that are on a same scanning line and have a largest correlation coefficient between them, as items that represent a same position; and a line segment determining procedure of determining whether or not line segments that are associated with each other as items that teach a same position are drawn in the plurality of images respectively, wherein when it is determined by said line segment determining procedure that the line segments are drawn, not such regions that are on the same scanning line and have a largest correlation coefficient between them, but intersections at which the scanning line and the line segments each cross are associated with each other by said associating procedure as items that represent a same position, wherein said associating unit generates disparity data supplemented by the supplementary lines by performing an association for each scanning line and wherein the generated disparity data is used to calculate a position in a three-dimensional coordinate system that corresponds to a pixel according to triangulation and extracts Digital Surface Model (DSM) data that includes altitude data indicating a height of a surface layer of an object, thereby to calculate a depth to the object and a shape of the object.

7. The stereo matching processing system according to claim 1, further comprising a supplementary line input flag for showing that supplementary lines have been input to a left image and a right image respectively.

8. The stereo matching processing system according to claim 7, wherein said associating unit checks a correlation between the left image and the right image.

9. The stereo matching processing system according to claim 1, further comprising an intersection coordinates buffer for storing coordinates of an intersection at which a supplementary line and a scanning line cross.

* * * * *